E. V. HARTFORD.
SHOCK ABSORBER.
APPLICATION FILED DEC. 10, 1910.
1,124,612.
Patented Jan. 12, 1915.
4 SHEETS—SHEET 1.
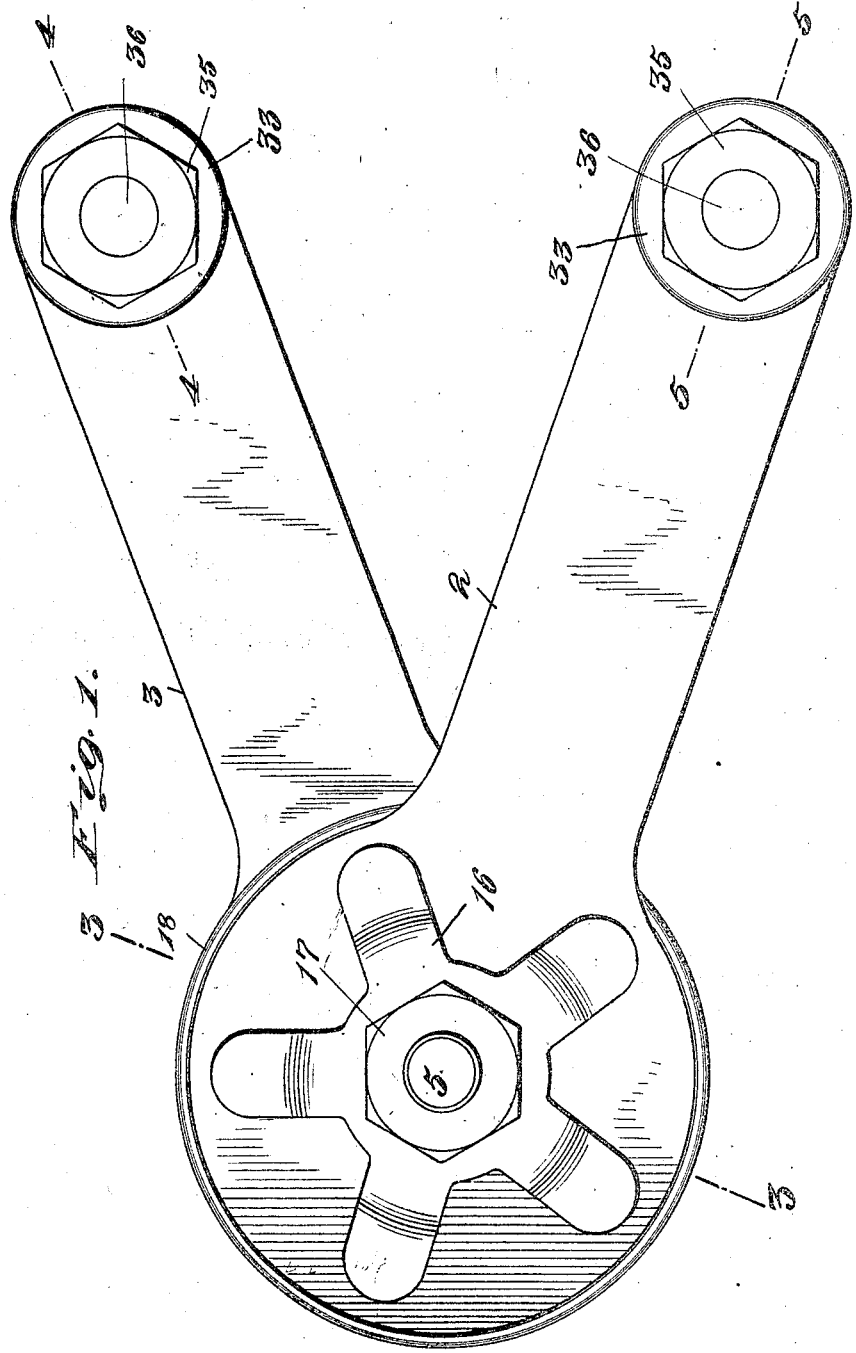

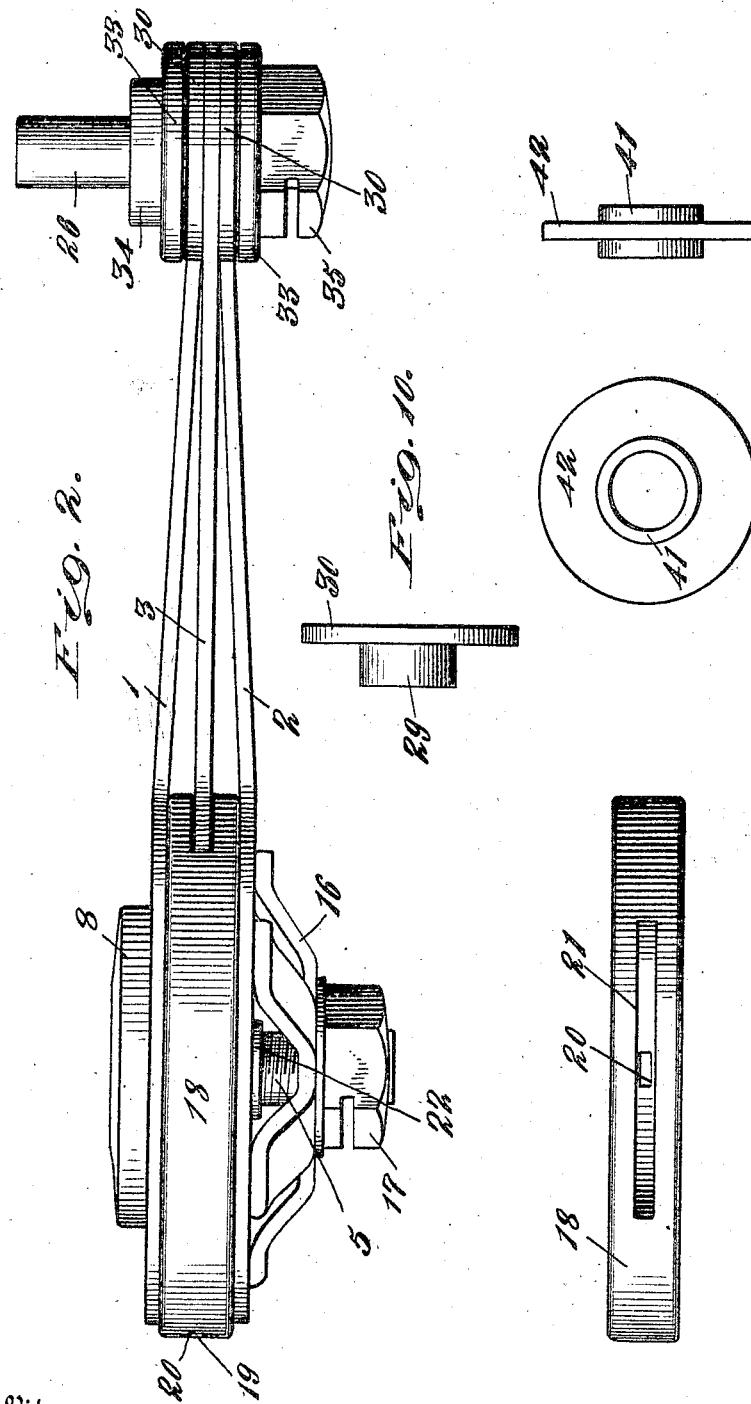

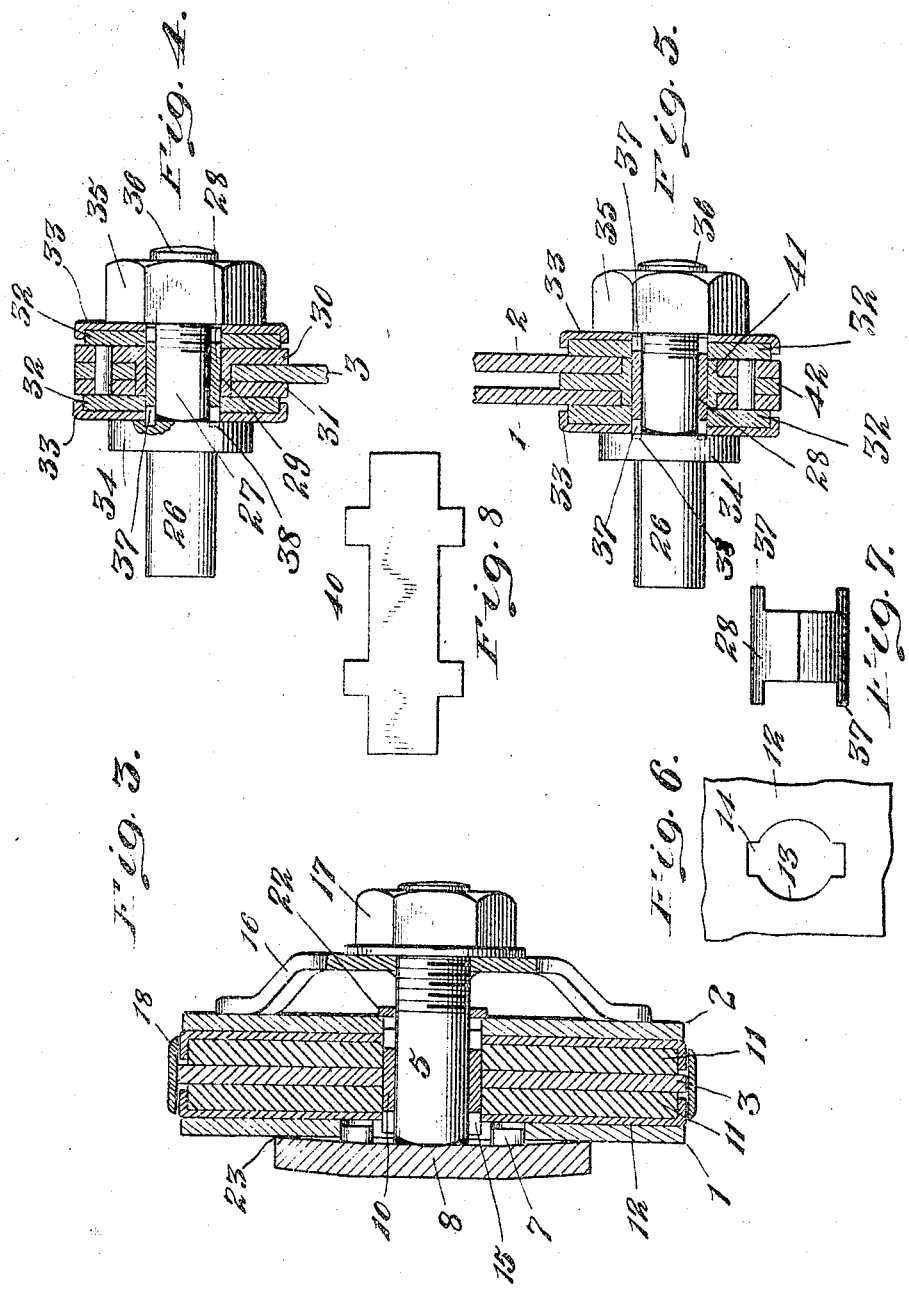

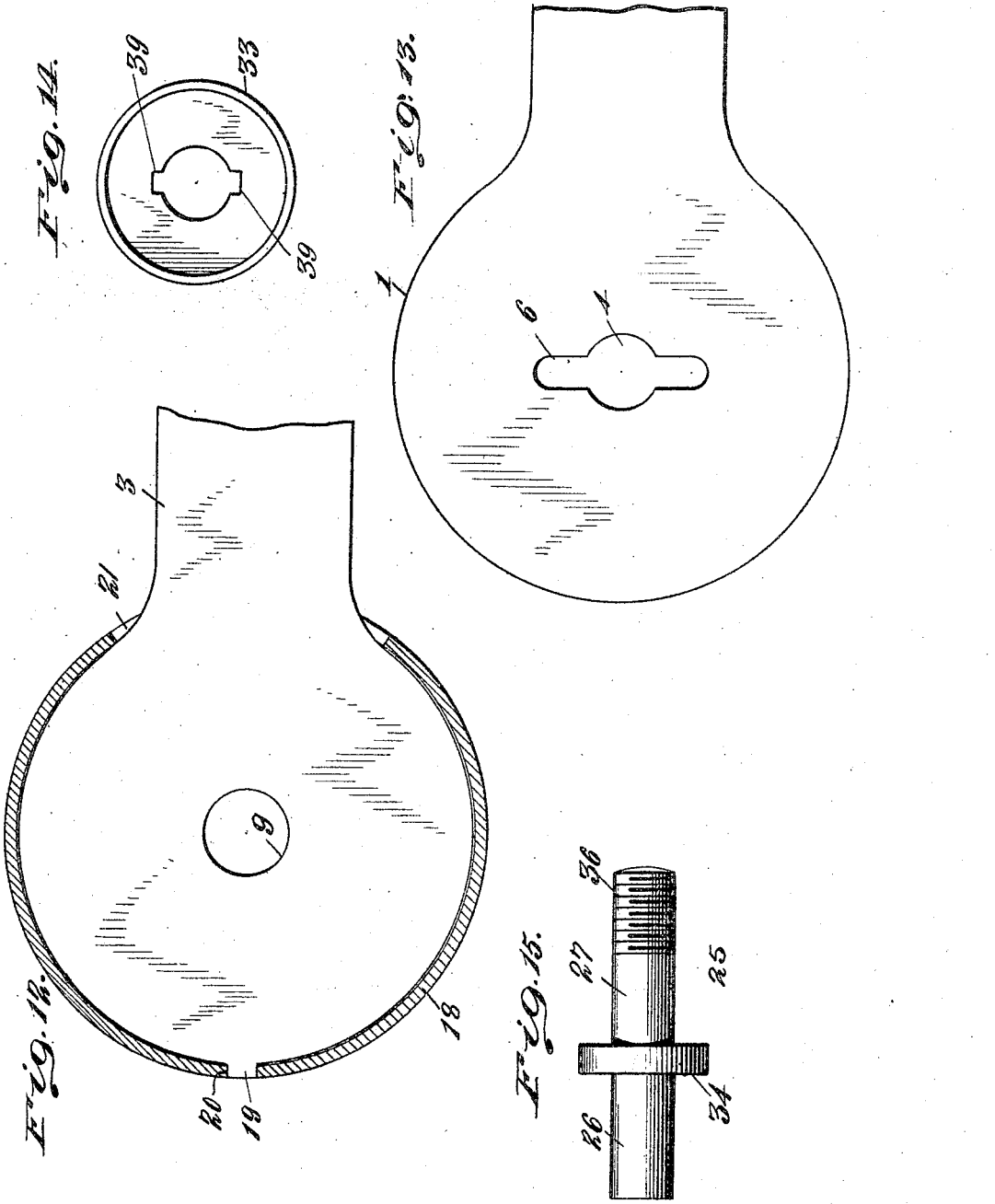

UNITED STATES PATENT OFFICE.

EDWARD V. HARTFORD, OF DEAL, NEW JERSEY.

SHOCK-ABSORBER.

1,124,612.

Specification of Letters Patent. Patented Jan. 12, 1915.

Application filed December 10, 1910. Serial No. 596,669.

*To all whom it may concern:*

Be it known that I, EDWARD V. HARTFORD, a citizen of the United States, residing at Deal, in the county of Monmouth and State of New Jersey, have invented certain new and useful Improvements in Shock-Absorbers, of which the following is a full, clear, and exact specification.

This invention relates to shock absorbers and has for an object to provide an improved device of this character wherein greater efficiency will be had, not only through the proper relation of the various parts which enter into the structure, but also in the special formation and manner of manufacture of some of these parts themselves. Not only is the life of the various parts had in mind in the design of the structure as a whole, but the friction is so distributed that there will be friction applied at a plurality of points upon the movement of the parts of the vehicle between which the device will be placed.

In the drawings accompanying and forming a part of this specification a practicable embodiment of one form of my invention is illustrated and in which drawings Figure 1 represents a side elevation of the shock absorber embodying one form of the invention. Fig. 2 is a top view of the device illustrated in Fig. 1. Fig. 3 is a section taken on a plane at about the line 3—3 of Fig. 1. Fig. 4 is a view taken on a plane at about the line 4—4 of Fig. 1. Fig. 5 is a section taken on a plane at about the line 5—5 of Fig. 1. Fig. 6 is a detail of a portion of the face of one of the friction disk cups. Fig. 7 is an elevation of a form of bushing shown surrounding the pivot pins at the ends of the arms, those pivot pins which are employed for securing the device to the vehicle parts. Fig. 8 is a detail view of the blank from which the bushing shown in Fig. 7 is made. Fig. 9 is an end view of the dust-band or housing which surrounds the central portion of the device. Fig. 10 is a side elevation of an anti-friction bearing which is shown in Fig. 4, the upper end or arm. Fig. 11 is a face view and elevation of the anti-friction bearing shown in Fig. 5, the lower end or arm. Fig. 12 is an elevation of the pivot end of the center arm or the upper arm in Fig. 1, and a cross-section of the dust band. Fig. 13 is a similar view of one of the outer arms, the lower arm in Fig. 1. Fig. 14 is a face view of one of the anti-friction disk cups for use at the arm ends; and Fig. 15 is an elevation of one of the pivot pins for the arm ends.

My improvements, in the present illustration, is shown embodying some of the features of the present commercial form of shock absorber and is made up with somewhat of the general external appearance of those now on the market. The device is shown as embodying a pair of outer arms 1 and 2, which will be fastened to some part of the vehicle, as for instance, the axle, and between the ends of which pair of arms is interposed the end of a central arm 3, which will be secured at its free end to another part of the vehicle movable relatively to the former part, as for instance, the body of the vehicle. From the fact that the single or central arm is described as being attached to the vehicle body, which will normally be above the axle, the arm 3 might be called the upper arm and the pair of arms 1 and 2 the lower arm. The arms of the pair are shown provided with openings 4, through which a pivot pin 5, will pass. Such openings 4, are shown provided with lateral openings 6. These lateral openings 6, in one of the arms, as for instance, the arm 1, will receive pins 7, carried by the head 8, of the pivot pin 5. By this means the pivot pin is held from rotary movement relatively to the arm 1. Since the arms of the pair are held together at their free ends, the pivot pin will be held from relative rotation in respect of both of the outside arms 1 and 2. The ends of all of the arms are shown enlarged at their point of frictional contact one with the other for giving an increased frictional area. The end of the central arm 3 is shown provided with a centrally-disposed opening 9, for surrounding the pivot pin 5. By this means the arm 3 and the arms 1 and 2 may be pivotally connected together. A bushing 10, which will be described in detail later, is shown interposed between the pivot pin 5 and the edges of the opening 9. Disks 11 are shown mounted upon each side of the arm 3, where this is interposed between the arms 1 and 2, and these disks will be of some suitable material to afford a non-abrading friction between the parts when moved one relatively to the other. Each of the disks 11 is shown mounted in a cup 12, which cups lie flat upon the inner faces of the outer arms 1 and 2. These cups will be provided adjacent the openings 13, which receive the pivot pin, with lateral openings 14 for receiving the lugs 15 at the ends of the bushing 10, and such lugs 15 will be long enough to pass into the lateral openings 6, in the arms 1 and 2. By this means the cups 12 are prevented from rotation relative to the arms 1 and 2, so that the friction will take place between the disks 11 and the cups 12 and between the disks 11 and the sides of the arm 3.

The portions of structure above described will be held in place in some suitable manner, as for instance, by means of a spring spider washer 16, tension on which will be applied by means of a nut 17, mounted on the pivot pin 5.

For the purpose of preventing the entrance of dust into the spaces between the frictionally-moving parts, a dust ring 18 is shown mounted fast upon the arm 3 and overlying the openings between such arms and the flanges of the cups 12. The central arm 3 is shown provided with a lug 19 (see Fig. 12), seated in a socket 20, in the ring 18 (see Fig. 9). The ring is provided with a slot 21, embracing the arm 3 beyond its enlarged friction portion. This structure affords an inexpensive and efficient fastening for the dust ring. It also assures the proper positioning of the ring upon reassemblage of the device without any effort on the part of the mechanic, since it prevents displacement on disassemblage.

A dust-tight joint about the pivot pin may be secured by means of a dust-guard 22, closely engaging the pin and the side of the arm 2. The head 8 of the pivot pin is shown somewhat dished and presenting a sharp edge 23 engaging the arm 1, whereby a dust-tight fit will be had at this side of the structure. The head 8 thus acts as a dust-guard. Upon relative movement of the parts of the vehicle to which the pair or arms 1 and 2 and the arm 3 are respectively connected, the friction, adjusted and regulated by means of the nut 17, will be applied, and the movement of the parts resisted to the extent desired.

It is sometimes desirable to distribute the friction and not only have the friction applied at the point of pivotal connection between the upper and the lower arms, but also to have the ends of these arms where pivoted to the vehicle parts provided with friction-applying devices. Such devices are illustrated herein.

In Fig. 4 the connection for the upper arm in Fig. 1 (the single arm 3), is illustrated, which comprises a pivot pin and attaching member, having a portion 26 for attachment in some convenient manner to a portion of the vehicle, as for instance, the body of the vehicle. It has a pivot portion 27, about which the arm 3 will oscillate upon the relative movement of the vehicle parts. A bushing 28 is mounted upon the pivot-pin-portion 27. The arm 3 is provided with an eye of much greater radius than the radius of the bushing and between this eye and the bushing 28 is interposed a bushing 29, which has a working fit upon the bushing 28. The bushing 29 is carried by a disk 30, which engages one side of the arm 3, and in connection with a disk 31, which lies upon the other side of the arm and surrounds the bushing 29, is riveted to the arm 3. The disks 30 and 31 receive frictional engagement, preferably from washers 32, made of some suitable material, as for instance, that referred to in connection with the central frictional portion of the device. These friction washers 32 are shown mounted in washer cups 33, one of which engages a collar 34, at the end of the pivot-pin-portion 27, and the other of which engages the back face of the nut 35, which is mounted on the screw-threaded-portion 36 of the attaching member, and holds the parts of the device together and regulates the friction between the parts. The bushing 28 is illustrated in side elevation in Fig. 7 and in spread-out detail in Fig. 8. It is provided with longitudinally-extending lugs 37, which at one end enter sockets 38, in the collar 34, passing through lateral openings 39, in the cups 33, somewhat in the manner in which the lugs 15 pass through the lateral openings 14 in the cups 12. The lugs 37 at the other end of the bushing engage similar lateral openings in the cup 33 at that end. By this means the friction cups which receive the friction of the washers 32, will be held from movement relative to the collar 34, the nut 35, and the pivot-pin-portion 27. The wear between the arm 3, which is of sheet metal, and the pivot pin 27, will be minimized, since this arm carries the elongated bearing surface, the bushing 29, which engages the bushing 28.

The bushing 28, as well as the bushing 10, may preferably be made out of sheet metal of sufficient hardness to present a proper bearing surface and of sufficient elasticity or resiliency that it may have a close and clinging contact with the pivot pin upon which it is mounted, so that not only will there be an absence of movement between the bushing and the pivot pin, but there will be no tendency to movement. The clinging connection between the bushing and the pivot pin will relieve to a large extent the strain upon the lugs, which are intended to prevent the parts from moving. The member comprising the bushing 29 and the disk 30 is illustrated in elevation in Fig. 10.

Not only is this portion of the device advantageous in affording this close fit between the pivot pin and the bushing, but it decreases the cost of manufacturing this part and enhances its efficiency, its strength. Heretofore these bushings were made from a solid piece of stock which was bored out and then the end was milled across, leaving lugs at the sides, which lugs, owing to their shape and the manner in which they were manufactured, were not as strong as the situation sometimes demanded, and their manufacture was expensive. In the present method the blanks 40 (see Fig. 8), will be struck up from sheet metal and bent into shape, after which they may be hardened to the desired degree.

The friction device for the lower arm of Fig. 1, that is, the pair of arms 1 and 2, is illustrated in Fig. 5. In this instance, instead of the member illustrated in Fig. 10 embodying the bushing 29 and disk 30 in conjunction with the disk 31, there is employed a device illustrated in Fig. 11, embodying a bushing 41, having a centrally-disposed disk 42, which is interposed between the free ends of the arms 1 and 2 and which affords a bearing between said arms 1 and 2 and the pivot pin, in the present illustration the pivot pin 27 surrounded by its bushing 28. In other respects the friction member for the lower arm is shown substantially the same in construction as is the friction member for the upper arm. In considering the upper arm and its connections, it will be noted that the bushing 29 is longer than it need be simply to pass through the opening in the arm 3, and that the surplus portion of the bushing is surrounded by the disk 31. By the addition of this disk 31 and the elongated bushing 29, the center bushing, the pivot pin, and the associated parts may be made the same and interchangeable for the upper and for the lower arms; and furthermore the structure when assembled and in use will present the same appearance for the upper and for the lower arms, with the exception that from one there extends one sheet metal arm and from the other there extend two sheet metal arms.

I claim:

1. In a shock absorber, the combination with a pair of sheet metal arms, of a sheet metal arm interposed between these, friction washers between the side faces of the interposed arm and the adjacent faces of the arms of the pair, and members interposed between each washer and the adjacent arm of the pair, and a bushing on the pivot pin, said bushing being provided with lugs, and the arms of the pair and the interposed members being provided with slots for engaging said lugs, said members being thereby rendered operable in unison with said arms.

2. In a shock absorber, the combination with a pair of arms, one a double arm and one a single arm, the end of the single arm being located between the ends of the double arm, of a pivot articulating these together for relative angular movement, a friction member mounted on the pivot adjacent the inner face of each double arm member, and a bushing surrounding the pivot and having lugs engaging the friction members and the double arm members for preventing independent relative angular movement of these parts, said bushing being capable of movement with said friction members and said double arm members.

3. In a shock absorber, the combination with two arms, of a pin, a bushing mounted on the pin and provided with integral lugs engaging one of the arms for preventing rotation of the bushing relatively to such arm and affording a bearing for the other arm.

4. In a shock absorber, the combination with a pin provided with a socketed shoulder, of a bushing mounted upon the pin and having integral lugs at each end, the lugs at one end engaging the said sockets, an arm movable relatively to such bushing, wear plates mounted upon the pin, and provided with recesses for receiving the lugs at the respective ends of the bushing for preventing relative rotation between the pin and the wear plates.

5. In a shock absorber, the combination with a pivot pin, of relatively-movable parts mounted upon said pivot pin, a split spring bushing provided with lugs and clampingly engaging said pivot pin, the lugs engaging some of said relatively-movable parts for holding these from movement relative to the bushing.

6. In a shock absorber, the combination with a pair of arms, of a pivot pin for pivoting these together, and a pivot pin for pivoting the free ends of each arm to a vehicle part, a split spring bushing mounted on each of said pivot pins, and members for frictionally engaging the said arms mounted on the said pivot pins and engaged by the said bushings.

7. In a shock absorber, the combination with a pair of sheet metal arms, of a sheet metal arm interposed therebetween, a member in engagement with each of the inner faces of said pair of arms, friction washers contained within said members and in engagement with the opposite surfaces of the intermediate arm, a pivot pin, a bushing rotatable on said pivot pin and in engagement with each of said members and with said pair of arms, and movable therewith, said washers and said intermediate arm being movable on said bushing.

8. The combination with a pivot pin of a pair of members maintained at fixed distances apart, a member mounted intermediate of said pair of members, a member in engagement with the inner surface of each of said pair of members, a pair of friction washers in engagement with said members and with said intermediate member, and a bushing rotatable on said pivot pin and movable with certain of said members, the remaining members being capable of movement independently of said bushing.

9. In a shock absorber, the combination with a bifurcated arm, of an arm interposed therebetween, a retaining member in engagement with the inner faces of said bifurcated arm, a friction washer located within each of said retaining members and in engagement with said intermediately located arm, a pivot pin, a bushing rotatable thereon, and in concurrently operable engagement with said retaining members and with said bifurcated arm, said washers and said intermediate arm being rotatable independently of said bushing, and a member in fixed engagement with said intermediate arm and in movable engagement with each of said retaining members.

In witness whereof I have hereunto set my hand in the presence of two subscribing witnesses.

EDWARD V. HARTFORD.

Witnesses:
LOUIS MASTRANGEL,
JNO. A. HARTFORD.